United States Patent [19]

Jackson

[11] Patent Number: 4,553,726
[45] Date of Patent: Nov. 19, 1985

[54] ADJUSTABLE HEIGHT SEAT APPARATUS FOR COMBAT VEHICLE

[75] Inventor: Theodore A. Jackson, Utica, Mich.

[73] Assignee: Ex-Cell-O Corporation, Troy, Mich.

[21] Appl. No.: 533,474

[22] Filed: Sep. 19, 1983

[51] Int. Cl.⁴ .............................................. E04G 3/00
[52] U.S. Cl. .............................. 248/297.1; 248/297.3; 297/308
[58] Field of Search .................. 248/297.3, 123.1, 125, 248/200.1, 297.1, 162.1; 297/308

[56] References Cited

U.S. PATENT DOCUMENTS

| 343,276 | 6/1886 | La Bar et al. | 248/125 X |
| 1,242,024 | 10/1917 | Nichols | 248/125 |
| 1,826,643 | 10/1931 | Anderson | 248/297.3 X |
| 2,675,132 | 4/1954 | Susil | 248/297.3 X |
| 2,909,212 | 10/1959 | Scherer | 248/408 |
| 2,935,120 | 5/1960 | Naus | 297/337 |
| 3,123,024 | 3/1964 | Bronson | 248/123.1 X |
| 4,148,524 | 4/1979 | Guyton | 248/407 X |
| 4,186,963 | 2/1980 | Koutsky | 248/576 X |

FOREIGN PATENT DOCUMENTS

| 23723 | 7/1935 | Australia | 248/125 |
| 543808 | 1/1956 | Netherlands | 248/125 |

Primary Examiner—J. Franklin Foss
Assistant Examiner—David L. Talbott
Attorney, Agent, or Firm—Edward J. Timmer

[57] ABSTRACT

A seat carriage is moveable vertically relative to a vertical support member by a first guide roller thereon located behind the support member and second guide roller thereon located in front of the support member diagonally below the first roller and by a constant load type spring secured on the support member and secured to the seat carriage to bias it upwardly when the carriage is unlocked from its adjusted position. The seat carriage can be easily locked or unlocked relative to an adjusted position by a toggle actuated spring-biased pin thereon engaged in one of several height adjustment apertures on the support member.

8 Claims, 9 Drawing Figures

ADJUSTABLE HEIGHT SEAT APPARATUS FOR COMBAT VEHICLE

FIELD OF THE INVENTION

The present invention relates to an adjustable, stowable seat apparatus and more particularly to a seat apparatus for a gunner or range finder operator in an armored or other combat vehicle or for other personnel requiring frequent vertical seat adjustment.

BACKGROUND OF THE INVENTION

The McMichael U.S. Pat. No. 2,937,692 discloses a range finder operator's seat which enables the operator to raise and lower the seat to follow the eyepiece of the range finder during operation thereof. The seat adjustment and locking mechanisms there disclosed are quite complex, including numerous components and assemblies, which may present maintenance and durability problems especially in a combat environment.

The Scherer U.S. Pat. No. 2,909,212 discloses a spring loaded locking mechanism for a chair pedestal. A fingeroperated lever is provided with cam surfaces adapted to engage surfaces on a spring-biased plunger to withdraw the plunger tip from spaced sockets along the length of the pedestal for height adjustment purposes.

U.S. Pat. No. 2,935,120 issued May 3, 1960 to G. L. Naus discloses a vertically adjustable seat and backrest for a locomotive operator. A foot-operated dog mechanism cooperates with height adjusting teeth on an outer hollow seat support tube for seat adjustment purposes. The seat is rotatable relative to the backrest.

The Guyton U.S. Pat. No. 4,148,524 issued Apr. 10, 1979 describes a vertically adjustable seat also having a foot operated adjustment mechanism including a footrest which is pivotably lifted to engage and disengage a locking pin relative to associated locking holes or slots in an inner tubular support.

The Koutsky U.S. Pat. No. 4,186,963 issued Feb. 5, 1980 shows a vehicular seat wherein a seat carriage rolls relative to a roller housing and can be latched in adjusted position by a hand operated latch.

SUMMARY OF THE INVENTION

It is an object of the present invention to provide an adjustable height seat apparatus which is compact and simple in construction and which is especially useful in vehicles having limited interior space such as armored personnel carriers, tanks and other combat vehicles, although it is not limited thereto.

It is another object of the invention to provide such an adjustable height seat apparatus which is advantageous from a maintenance and durability standpoint especially in a combat environment where the apparatus can be subjected to drenching with salt water and infiltration of dust, dirt and other foreign matter.

It is still another object of the invention to provide such an adjustable height seat apparatus which can be operated easily and frequently to change seat height.

In a typical working embodiment of the invention, the adjustable height seat apparatus includes a support means extending upwardly from a base and having a plurality of height adjustment means such as apertures spaced along the length thereof. A carriage means includes a seat preferably pivotally connected to the front thereof and further includes a first guide means behind the support means and second guide means in front of the support means diagonally below the first guide means to allow vertical movement of the carriage relative to the support means in smooth fashion with the seat cantilevered therefrom. Constant load type spring means rotatably supported on the support means is secured to the carriage means to bias it and the attached seat in the upward direction when a position locking means is released. The locking means includes a spring biased pin means adapted to engage the height adjustment apertures and toggle linkage means connected to the pin means to effect engagement or release thereof relative to the height adjustment apertures.

In a particularly preferred embodiment, the guide means include a first roller means supported behind the support means in rolling contact therewith by spaced side walls of the carriage means and a second roller means supported in front of the support means in rolling contact therewith by the same side walls. Stationary guide plates may also be provided between each side wall of the carriage means and the facing adjacent side of the support means to provide full lateral guiding action for the carriage means.

DESCRIPTION OF PREFERRED EMBODIMENTS

Figure 1:
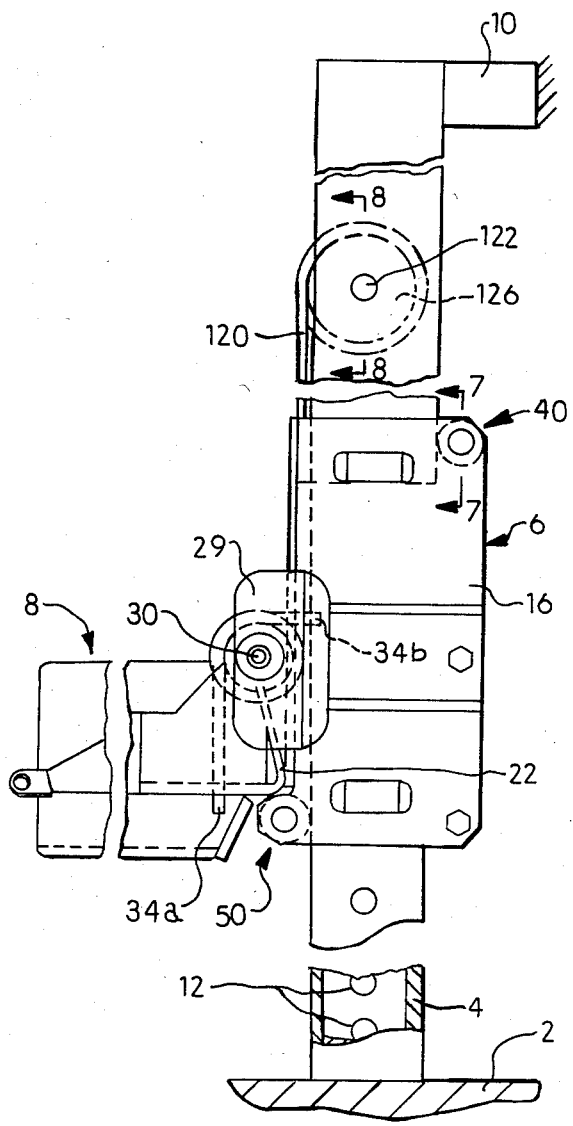
FIG. 1 is a side elevation of the seat apparatus of the invention.

The adjustable height seat apparatus is shown in FIGS. 1-9 as including a base 2, a hollow support tube 4, a carriage 6 and a seat 8 pivotally connected to the front of the carriage for vertical movement along the support tube.

The seat apparatus shown is especially adapted for use in an armored personnel carrier in which interior space is limited and which in combat use exposes the seat apparatus to dust, dirt and other foreign matter as well as to drenching with salt water during beach landings. The seat apparatus, as already mentioned, is designed to be compact, space-saving and simple in construction and to be durable and relatively maintenance-free in use in such a vehicle.

In use in such a vehicle, the base 2 of the seat apparatus is secured to the floor of a gunner operator's cage (not shown) which is rotatable with the gun turret. Of course, the base 2 may comprise the floor of the cage. The support tube 4 is attached at its lower end to the base 2 such as by welding, bolting and the like and its upper end is similarly attached to a bracket 10 extending from the roof or side of the gunner's cage. The support tube 4 extends upwardly from the base 2 and includes a plurality of height adjustment apertures 12 spaced apart along its length. As is apparent from FIG. 1. the support tube 4 has a generally square or rectangular cross-section, although other cross-sections may be employed.

Figure 2:
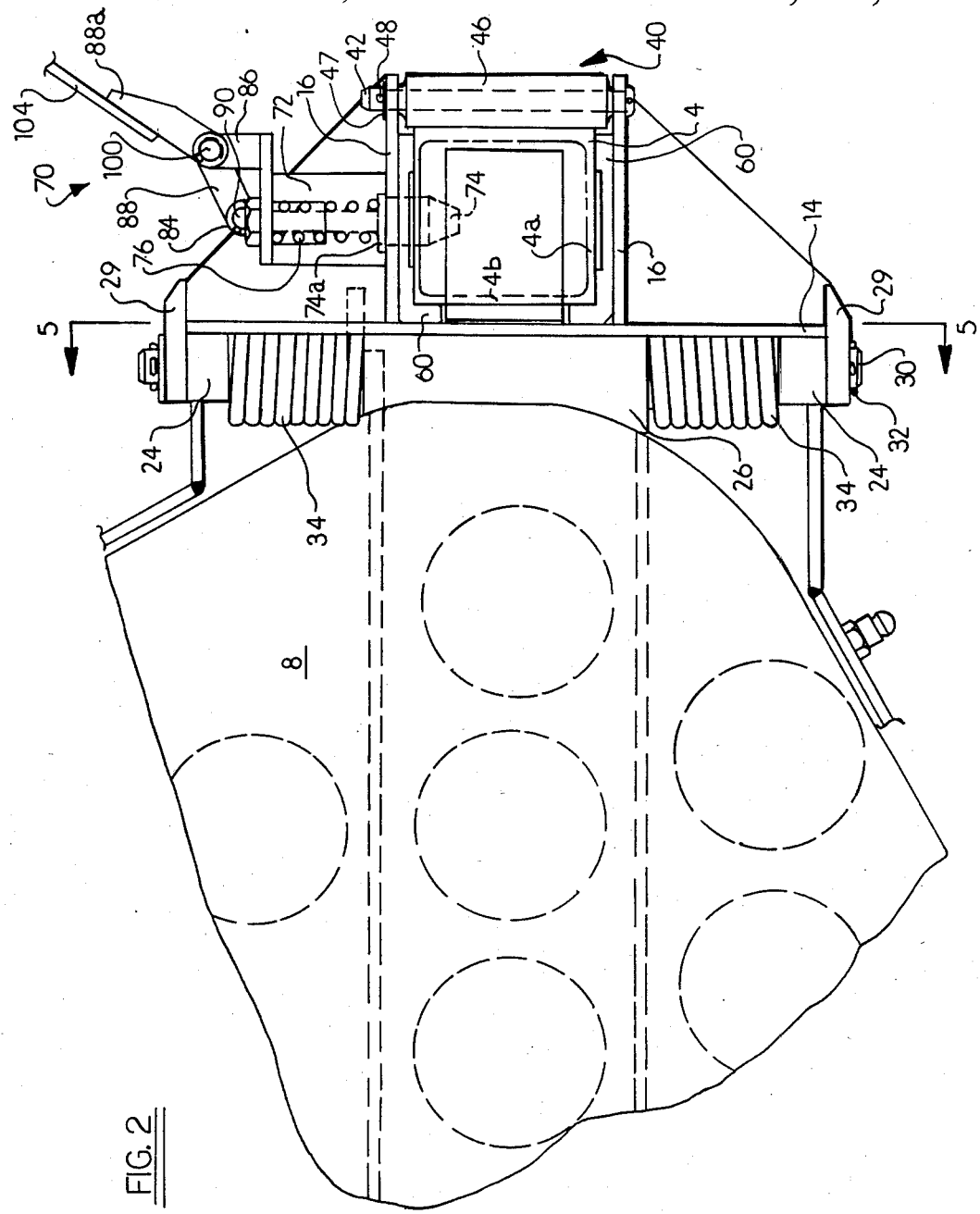
FIG. 2 is a plan view thereof.
Figure 3:
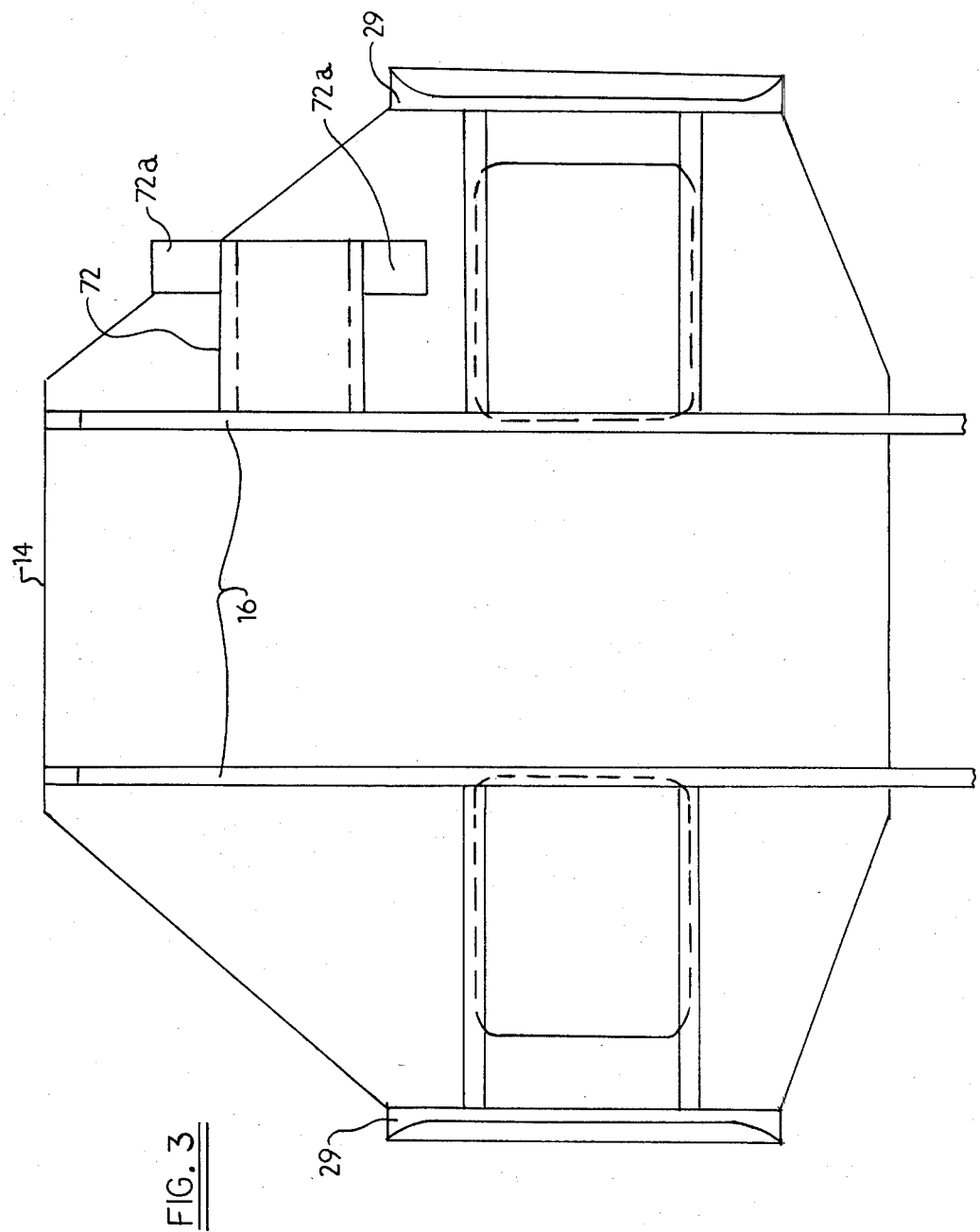
FIG. 3 is a side elevation of the carriage.
Figure 4:
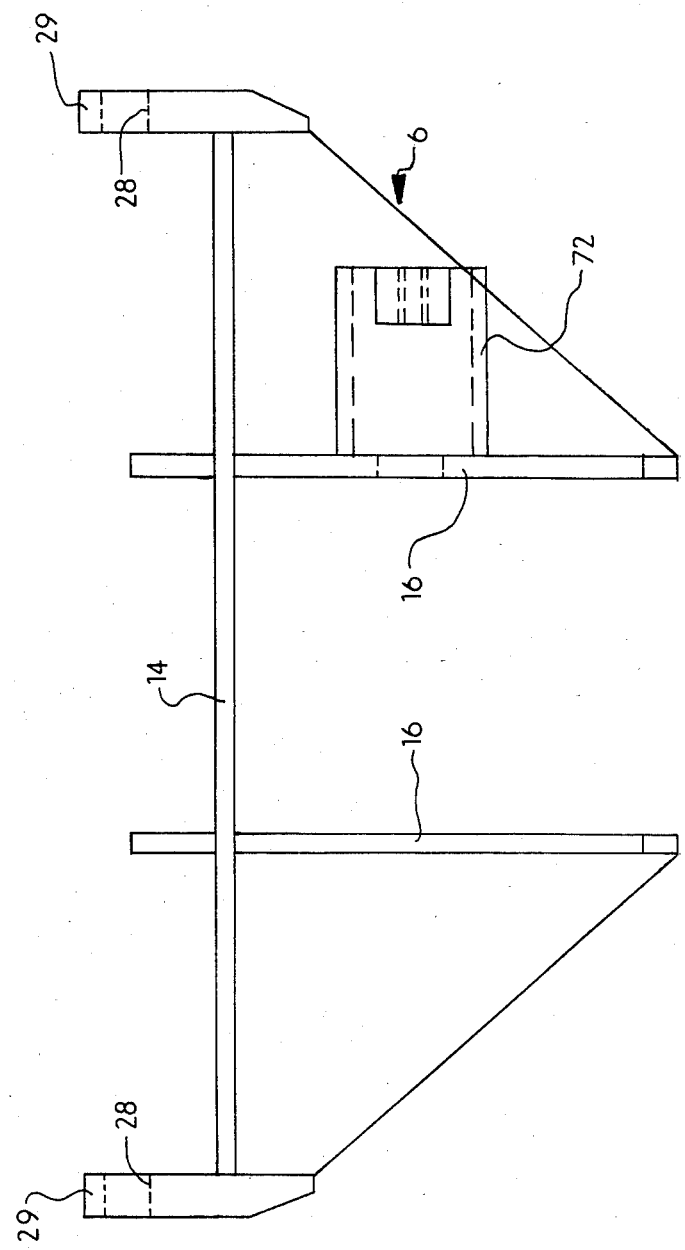
FIG. 4 is a top elevation of the carriage.
Figure 5:
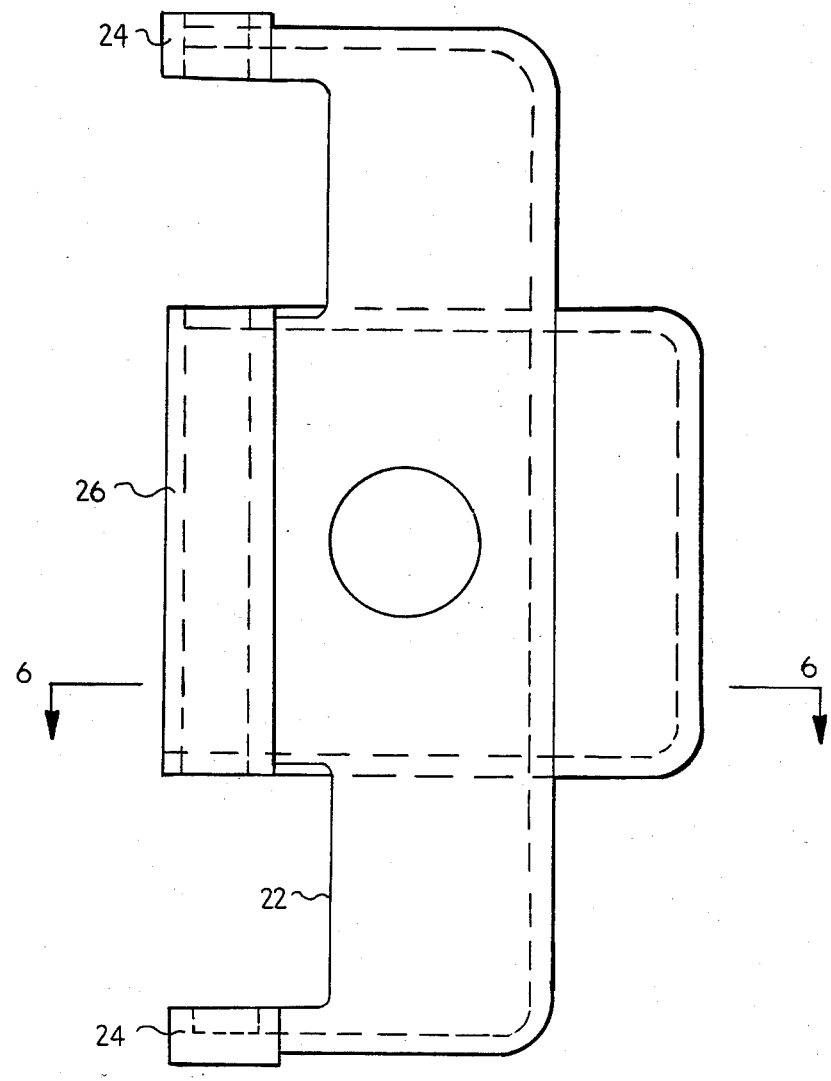
FIG. 5 is an elevational view of the seat taken along line 5—5 of FIG. 2
Figure 6:
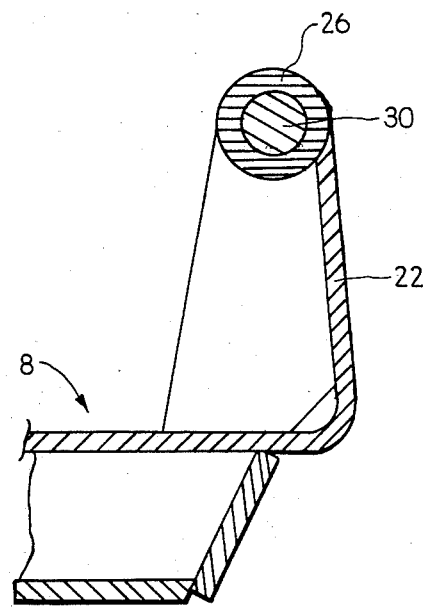
FIG. 6 is a partial sectional view taken along line 6—6 of FIG. 5.
Figure 7:
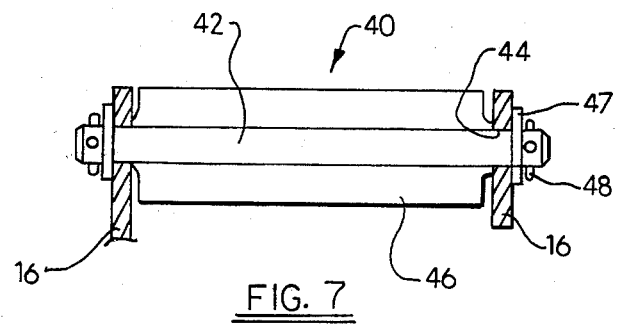
FIG. 7 is a partial sectional view along line 7—7 of FIG. 1.
Figure 8:
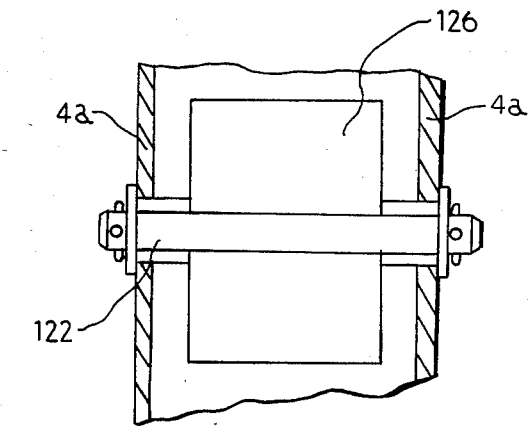
FIG. 8 is a partial sectional view along line 8—8 of FIG. 1.

The carriage 6 is movably mounted on the support tube 4 and includes a carriage frame having a front wall or plate 14 and a pair of spaced parallel side walls or plates 16 extending from the front of the support tube to behind it as shown in FIG. 2.

Pivotally attached to the front wall 14 of the carriage is the seat 8. The seat includes an end plate 22 having a pair of spaced pivot tubes 24 and an intermediate pivot tube 26 axially aligned therewith. These pivot tubes are in further axial alignment with spaced apart pivot openings 28 in ears 29 on the front plate 14 of the carriage as shown best in FIG. 2. Received through the aligned pivot tubes and openings is a pivot pin 30 secured therein by cotter pins 32 at opposite ends thereof.

A coil spring 34 is received over the pivot pin 30 between pivot tubes 24 and pivot tube 26, see FIG. 2. One end 34a of each spring is secured to the seat 8 as shown in FIG. 1 while the other end 34b is nested against the front carriage wall 14. The seat is thereby pivotably connected to the carriage 6 and can be placed in a stowed position vertically against the front plate 14 or in a working position (FIG. 1) where the seat is cantilevered from the front plate.

Figure 9:
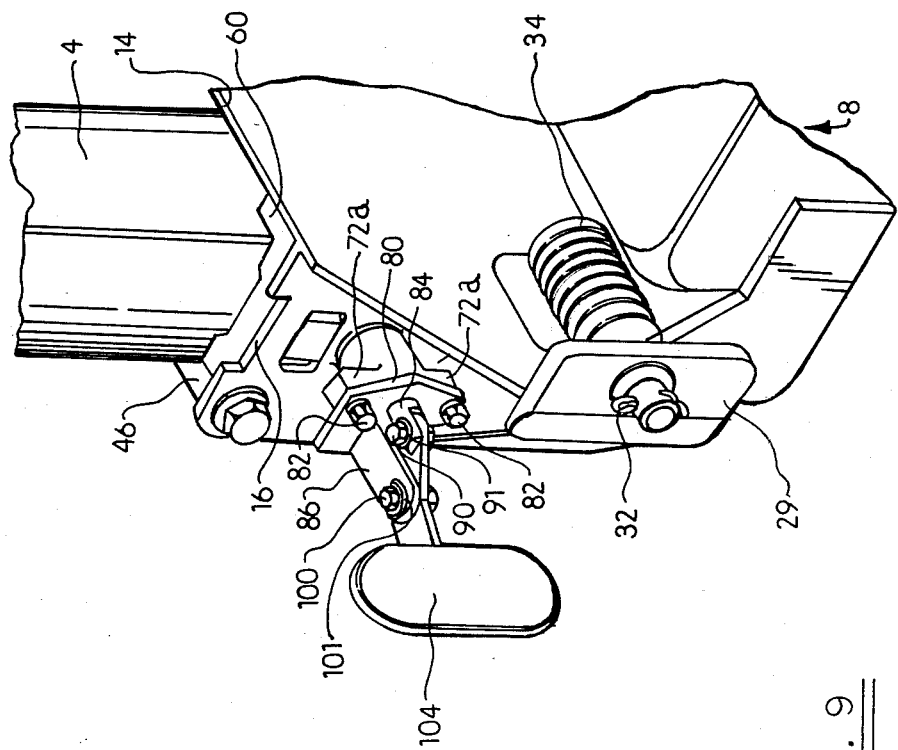
FIG. 9 is a perspective view of the locking mechanism.

The side plates 16 of the carriage 6 include a first guide roller assembly 40 supported between the plates behind the support tube 4 in rolling contact therewith. FIG. 9 shows that the roller assembly includes a pin 42 received in holes 44 in the side plates 16, a hollow nylon guide roller 46 on the pin, a washer 47 and four cotter pins 48 located outboard of the side plates to secure the pin ends against movement.

A second roller assembly 50 is supported between front extensions 16a of the side plates 16 in front of the support tube 4 in rolling contact therewith and diagonally below the first roller assembly 40 as shown best in FIG. 1. The second roller assembly includes the same components as just described for the first roller assembly with reference to FIG. 9.

As is apparent from FIG. 1, when the seat 8 is cantilevered from the front carriage plate 14, the torque exerted on the support tube 4 is transmitted by the first and second roller assemblies 40 and 50 and the rolling contact at these locations enables smooth movement of the carriage 6 vertically on the support tube for height adjustment purposes under such loading without binding or cocking of the carriage on the support tube. To further help in this regard, four generally L-shaped stationary guide members 60 are adhered to the side plates 16 in the vicinity of each roller assembly 40, 50 to engage lateral sides 4a and a portion of the front side 4b of the support tube 4 as shown.

As shown best in FIG. 2, one side plate 16 of the carriage frame carries a releasable locking mechanism 70 for locking the carriage and thus the seat at an adjusted position on the support tube 4. The locking mechanism includes a cylindrical tubular projection 72 with ears 72a on one of the side plates 16. Received within the cylindrical tubular projection is a locking pin 74 and a biasing spring 76 engaging a collar 74a on the pin to force it toward the support tube. At the other end, the spring 76 abuts a toggle linkage base plate 80 attached to the ears 72a by screws 82 (only one shown). The toggle base plate 80 supports clevis type pins 84 and 86. A single link 88 is pivotally connected to clevis pin 84 by pin 90, washer 91 and cotter pin 92 in well known fashion and to clevis pin 86 by a similar arrangement of pin 100, washer 101 and cotter pin 102. The link 88 includes a projecting arm 88a having a finger tab 104 for pushing by the seat operator. For example, the operator would push the finger tab 104 to the right in FIG. 2 to release the pin 74 from the particular height adjustment aperture 12 with which it was engaged. The toggle linkage is of the overthrow type such that it will remain released until the finger tab 104 is again pushed by the operator.

As shown in FIG. 1, a constant load type negator ribbon spring 120 is rotatably positioned inside the support tube 4 by a pin 122. The spring has one free end which is secured to the carriage front plate 14 at any suitable location. The negator spring 120 is a known type in the art which is wound on a spool 126 and when unwound will tend to assume its normal coiled condition around spool 126, thus biasing the carriage 6 and seat 8 connected thereto when the carriage is released from an adjusted position on the support tube 4.

The operation of the seat apparatus is simple; the operator merely pushes the finger tab 104 to release or lock the seat in adjusted positions as it moves vertically relative to support tube 4. When unlocked, the negator spring 120 tends to pull the carriage and seat upwardly. Movement downwardly is provided by the operator's weight overcoming the force of the negator spring. Thus, by varying sitting pressure on the seat and manipulating finger tab 104, the operator can control and adjust the vertical position of the seat. And, of course, the seat is stowable out of the way simply by pivoting it upwardly (FIG. 1) against the front plate 14 of the carriage.

While the seat apparatus of the invention has been described by a detailed description of certain specific and preferred embodiments, it is understood that various modifications and changes can be made in them within the scope of the appended claims which are intended to include equivalents of such embodiments.

I claim:

1. An adjustable height seat apparatus comprising:
(a) a base,
(b) a support means extending upwardly from the base and having a plurality of height adjustment means spaced along the length thereof,
(c) a carriage means carrying a seat on a front side thereof and forming a channel receiving said support means, said carriage means including a first guide roller means behind said support means in rolling contact therewith and a second guide roller means in front of said support means in rolling contact therewith and diagonally disposed relative to said first guide roller means to guide said carriage means and allow vertical movement thereof relative to said support means, said carriage means further including releasable locking means to engage said height adjustment means of said support means to releasably lock the carriage and seat in an adjusted position, and
(d) spring means having a spring member wound on a spool rotatably supported on said support means above the carriage means with the spring member having a vertically extending portion secured to said carriage to bias same upwardly when said locking means is released.

2. The seat apparatus of claim 1 which further comprises lateral guide means between said carriage and support means and between said first guide means and second guide means.

3. The seat apparatus of claim 1 wherein the support means is a hollow support tube having a plurality of height adjustment apertures.

4. The seat apparatus of claim 1 wherein the locking mechanism includes a spring biased locking pin means and a toggle linkage means connected to said pin means for engaging and releasing same relative to the height adjustment means.

5. The seat apparatus of claim 1 wherein the first guide means and second guide means are roller means in rolling contact with said support means.

6. The seat apparatus of claim 1 wherein the spring means comprises a constant load type coiled spring rotatably supported in said support means.

7. An adjustable height seat apparatus comprising:
(a) a base,
(b) a hollow support means extending upwardly from the base the having a plurality of height adjustment apertures spaced along the length thereof,
(c) a carriage means having a front wall with a seat connected thereto and spaced side walls extending from the front to behind said support means, said front wall and side walls forming a channel receiving said support means, first guide roller means supported between said side walls behind said support means in smooth rolling contact therewith, second guide roller means supported between said side walls in front of and in smooth rolling contact with said support means and diagonally below said first roller means whereby said carriage means can move vertically relatively to said support means for height adjustment, and further having means for releasably locking the position of said carriage and seat connected thereto, said locking means including a spring biased pin means adapted to engage one of the height adjustment apertures in said support means and toggle linkage means connected to said pin means operable to lock the carriage in adjusted position by engaging said pin means in one of said apertures and operable to release said pin from said one aperture for height adjustment, and
(d) constant load type spring means having a spring member wound on a spool rotatably supported on said support means above the carriage means with the spring member having a vertically extending portion secured to said carriage means to bias said carriage means and seat connected thereto in an upward direction when said pin means is released.

8. An adjustable height seat apparatus comprising:
(a) a base,
(b) a hollow tubular support means of generally rectangular cross-section extending upwardly from the base and having a plurality of height adjustment apertures spaced along the length thereof,
(c) a generally U-shaped carriage means having a front wall with a seat pivotally connected thereto sand spaced said walls extending from the front to behind said support means, said front wall and side walls forming a channel receiving said support means, first guide roller means supported between said side walls behind said support means in smooth rolling contact therewith, second guide roller means supported between said side walls in front of and in smooth rolling contact with said support means and diagonally below said first roller means whereby said carriage means can move vertically relatively to said support means for height adjustment, and further having means for releasably locking the position of said carriage and seat connected thereto, said locking means including a spring biased pin means adapted to engage the height adjustment apertures in said support means and toggle linkage means connected to said pin means operable to lock the carriage in adjusted position by engaging said pin means in one of said apertures and operable to release said pin from said one aperture for height adjustment, and
(d) constant load type spring means having a spring member wound on a spool rotatably supported inside said support means above the carriage means with the spring member having a portion extending vertically in front of said support means and secured to said carriage means to bias and carriage means and seat connected thereto in an upward direction when said pin means is released.

* * * * *